(No Model.)
T. S. MILLER.
SPOKE SOCKET FOR VEHICLE WHEELS.
No. 360,812. Patented Apr. 5, 1887.
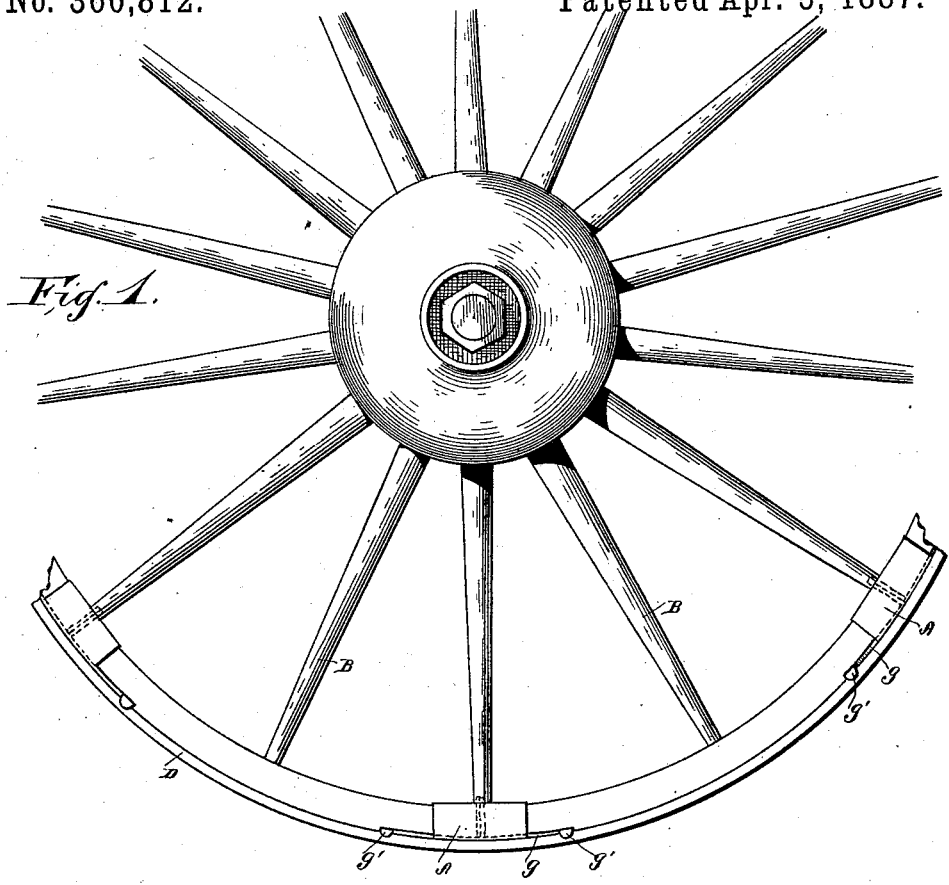
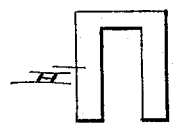
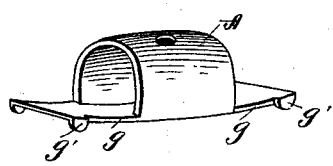
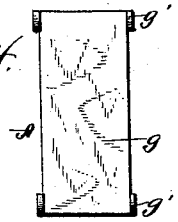
Witnesses:
John Enders Jr.
Theod. M. Gill.
Inventor:
Thomas S. Miller
By Myers & Co
Attorneys.

UNITED STATES PATENT OFFICE.

THOMAS S. MILLER, OF THE GROVE, TEXAS.

SPOKE-SOCKET FOR VEHICLE-WHEELS.

SPECIFICATION forming part of Letters Patent No. 360,812, dated April 5, 1887.

Application filed March 10, 1886. Serial No. 194,731. (No model.)

*To all whom it may concern:*

Be it known that I, THOMAS S. MILLER, a citizen of the United States of America, residing at The Grove, in the county of Coryell and State of Texas, have invented certain new and useful Improvements in Felly-Joints and Spoke-Sockets, of which the following is a specification, reference being had therein to the accompanying drawings.

This invention pertains to certain new and useful improvements in felly-joints and spoke-sockets; and it consists in the construction, combination, and arrangement of the parts, substantially as hereinafter fully set forth, and particularly pointed out in the claims.

In the accompanying drawings, Figure 1 is a side elevation of a vehicle-wheel embodying my invention. Fig. 2 is a perspective view. Fig. 3 is a detail, and Fig. 4 is an inverted plan view.

In carrying out my invention I employ the contrivance A, adapted to receive a tenon on the outer end of a spoke, B, and closely securing joints of fellies C in the rim of the wheel, and said tenon of the spoke B is fitted or sandwiched between the adjacent ends of said fellies.

This felly-joint and spoke-socket consists of an approximately-inverted U-shaped plate, as shown, and is provided in its center with an aperture for the insertion therethrough of the tenon on the end of the spoke. (Seen in Fig. 2.) The ends of the plate A are connected to or cast integral with the outer side edges of projecting plates or flanges $a\ a$, which fit in under the tire D of the wheel at each side of the joint of the fellies. Said plates or flanges $a$ are provided at their outer ends, at the sides, with lips or supplementary flanges $a'\ a'$, which hug or clamp the tire at its side edges, and thus tightly secure the same in place.

By the insertion and driving of a slotted wedge or washer, E, Fig. 3, between the ends of fellies C, said wedges being held in position by means of the felly-joint or spoke-socket A, (the slot thereof receiving the spoke-tenon,) shrinkage can be compensated for and the rim of the wheel kept solid, including the tightening of the tire, thus avoiding or answering the "upsetting" of the tire for that purpose.

Having thus fully described my invention, what I claim, and desire to secure by Letters Patent, is—

1. The herein-described felly-joint and spoke-socket, consisting of the U-shaped plate, the projecting plates or flanges, and the lips or supplementary flanges, arranged substantially as shown and described.

2. In a wheel, the combination, with a spoke, tire, and fellies, of the contrivance having at its ends flanges or plates provided at their side edges with lips or supplementary flanges clamping or hugging the tire, substantially as and for the purpose specified.

3. The combination, with a spoke having a tenon, the fellies, and the spoke-socket and felly-joint, of the wedge having a slot inserted between said fellies, substantially as shown and described.

In testimony whereof I affix my signature in presence of two witnesses.

THOMAS S. MILLER.

Witnesses:
J. NOTA McGILL,
HOWARD J. SCHNEIDER.